United States Patent
Dadhaniya et al.

(10) Patent No.: US 11,676,127 B2
(45) Date of Patent: *Jun. 13, 2023

(54) SYMBOLS TO INDICATE WHICH ATM TO USE

(71) Applicant: Capital One Services, LLC, McLean, VA (US)

(72) Inventors: Janak Dadhaniya, San Francisco, CA (US); Lisa Whitsitt, Millbrae, CA (US); Robert Smith, Crozier, VA (US); David Wurmfeld, Falls Church, VA (US); Steve Faletti, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 37 days.

This patent is subject to a terminal disclaimer.

(21) Appl. No.: 17/317,187

(22) Filed: May 11, 2021

(65) Prior Publication Data

US 2021/0279711 A1    Sep. 9, 2021

Related U.S. Application Data

(63) Continuation of application No. 16/405,272, filed on May 7, 2019, now Pat. No. 11,037,127.

(51) Int. Cl.
*G06Q 40/00* (2023.01)
*G06Q 20/32* (2012.01)
*G06Q 20/40* (2012.01)
*G06Q 20/10* (2012.01)

(52) U.S. Cl.
CPC ..... *G06Q 20/3223* (2013.01); *G06Q 20/1085* (2013.01); *G06Q 20/327* (2013.01); *G06Q 20/4014* (2013.01)

(58) Field of Classification Search
USPC ................................................. 705/35–44
See application file for complete search history.

(56) References Cited

U.S. PATENT DOCUMENTS 11,354,632 B1 * 6/2022 Hill .................. G07F 19/203
2018/0285843 A1 * 10/2018 Chaturvedi .......... G07F 19/211

* cited by examiner

*Primary Examiner* — Olabode Akintola
(74) *Attorney, Agent, or Firm* — KDW Firm PLLC

(57) ABSTRACT

A system and method are disclosed in which a symbol associated with an ATM of a plurality of ATMs is made available to a customer in response to a request for access to the ATM. The symbol identifies the ATM to the user in locations having multiple ATMs, thus avoiding confusion for the user. The symbol may be used for any of the possible transactions between the user and the ATM, such as balance inquiries, deposits, transfers, and cash withdrawals.

20 Claims, 18 Drawing Sheets

200B

200C

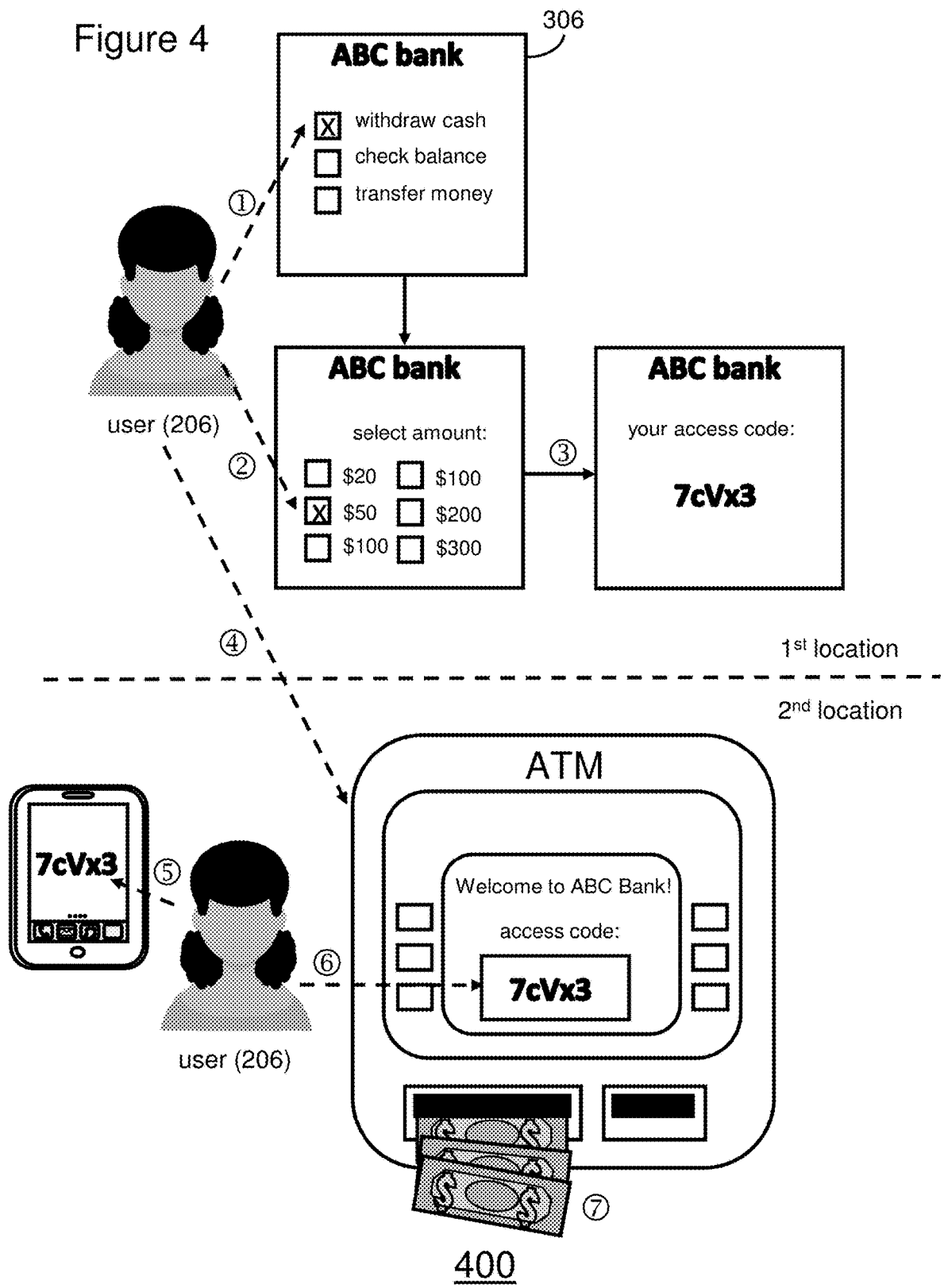

500A

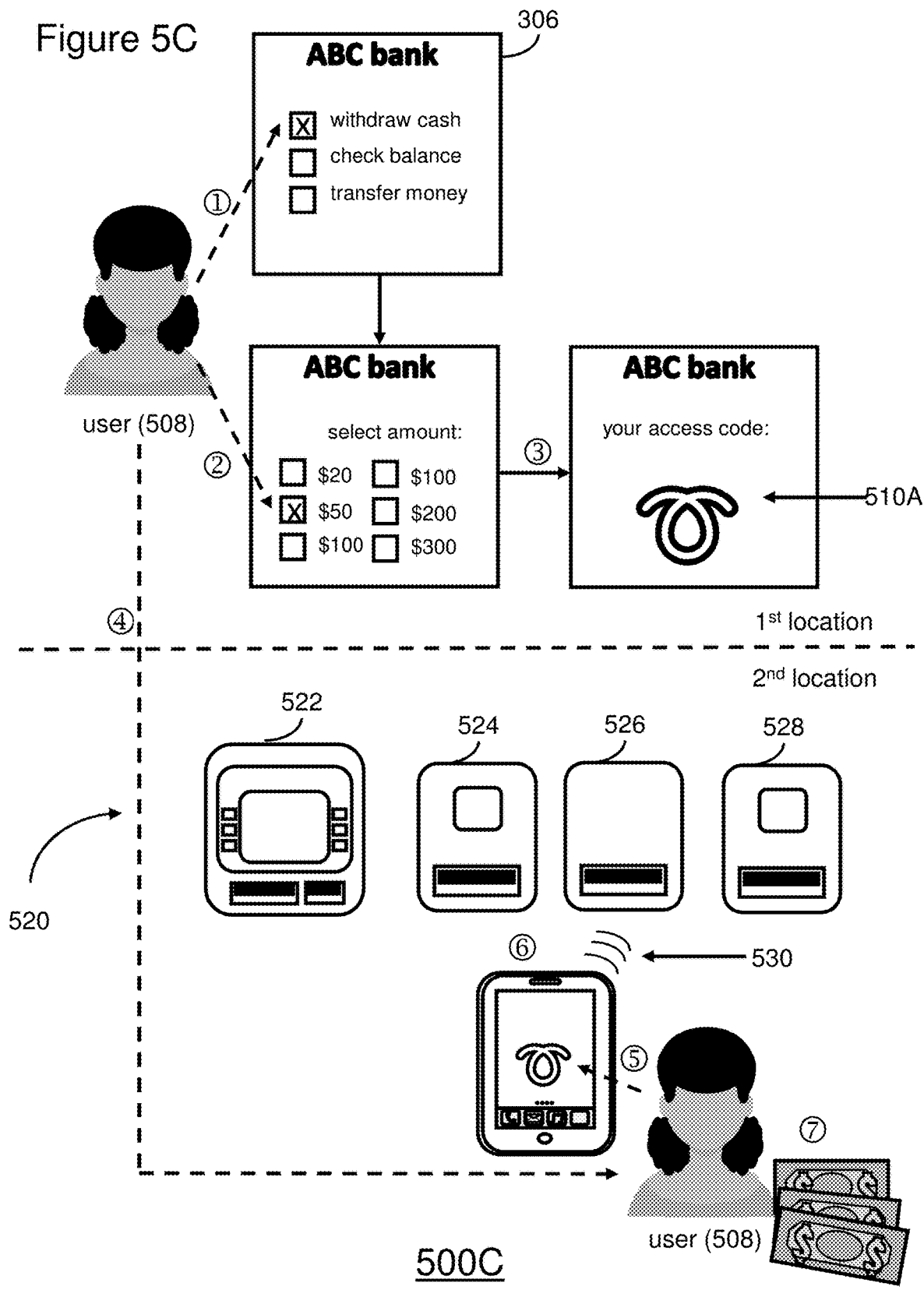

600A

600B

600C

600D

800A

SYMBOLS TO INDICATE WHICH ATM TO USE

CROSS-REFERENCE TO RELATED APPLICATIONS

This application is a continuation of U.S. patent application Ser. No. 16/405,272, entitled "SYMBOLS TO INDICATE WHICH ATM TO USE" filed on May 7, 2019. The contents of the aforementioned application are incorporated herein by reference in their entirety.

BACKGROUND

Automatic Teller Machines (ATMs) are electronic devices that enable customers of banks or other financial institutions to perform transactions related to accounts the customers hold with the institution. Information about the account, such as a balance, may be obtained using the ATM. Deposits and transfers between accounts may also be achieved using the ATM. The withdrawal of cash and simultaneous debit from the customer's account, is perhaps the most common use of an ATM.

Generally, the customer is identified by the ATM by inserting a card, such as a debit card, into a slot in the ATM. The ATM includes an interface in which the customer is prompted to enter a personal identification number (PIN) for authentication.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

FIG. 4 is a simplified illustration of a pre-staged transaction, according to some embodiments.

FIGS. 5A-5C are illustrations of an accountholder accessing an array of ATMs in three scenarios, according to some embodiments.

DETAILED DESCRIPTION

In accordance with the embodiments described herein, a system and method are disclosed in which a symbol associated with an ATM of a plurality of ATMs is made available to a customer in response to a request for access to the ATM. The symbol identifies the ATM to the user in locations having multiple ATMs, thus avoiding confusion for the user. The symbols are not sequential, so users do not know their actual place in line after pre-staging a transaction from their mobile device, which enables the server to change the order of processing, such as when an ATM is low on cash. The symbol may be used for any of the possible transactions between the user and the ATM, including balance inquiries, deposits, transfers, and cash withdrawals.

Figure 1:
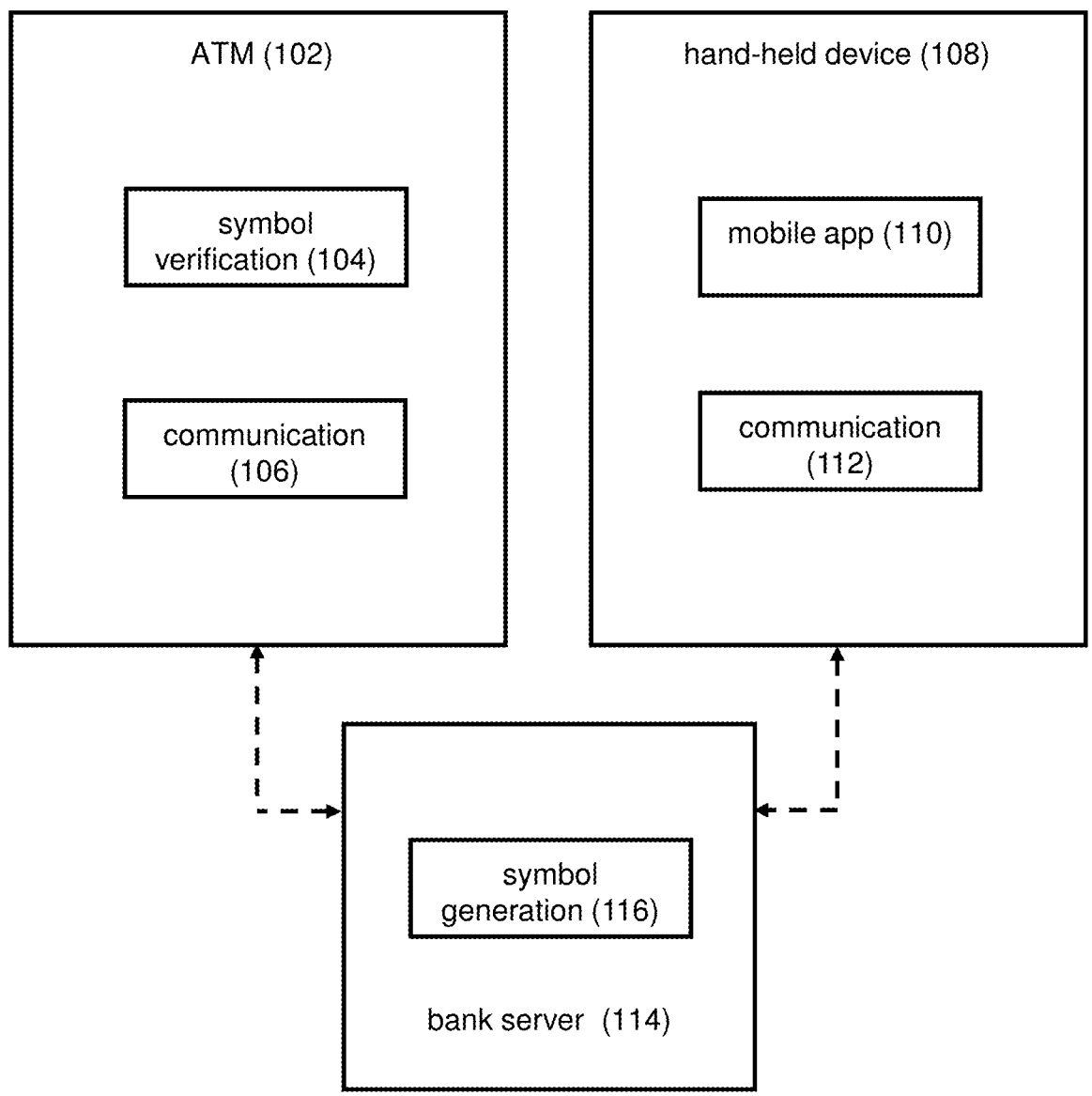
FIG. 1 is a simplified block diagram of an apparatus or method for symbol utilization, according to some embodiments.

FIG. 1 is a simplified block diagram of a method or apparatus for symbol utilization 100, according to some embodiments. The symbol utilization 100 involves interaction between an ATM 102 and an accountholder's hand-held device 112, although one or more of the operations of the hand-held device may be performed by an Internet-enabled device such as a laptop computer, as described below. In an embodiment, the symbol utilization 100 enables a mobile app 110 on a user's hand-held device 108, such as a cellphone or tablet, in which a user pre-stages a transaction to be completed at an ATM. In another embodiment, no transaction is pre-staged, but the mobile app 110 is used to indicate a request to later access an ATM. In another embodiment, a web page (not shown) is used for pre-staging a transaction using the symbol utilization 100 method. In another embodiment, the user accesses the web page to request subsequent access of an ATM (no pre-staging).

Both the ATM 102 and the hand-held device 108 are in communication with a financial institution, such as a bank via a bank server 114. The symbol generation 116 of the symbol utilization 100 is performed at the bank server 114, with the symbol then being transmitted to the ATM 102 and the hand-held device 108. Once a symbol is generated, the ATM 102 performs symbol verification 104 of the symbol on the hand-held device before enabling a transaction to be initiated or completed. Both the ATM 102 and the hand-held device 108 include communication mechanisms 106, 112, respectively, enabling the two devices to be in contact during the transaction.

In some embodiments, the bank server 114 is a computing system of the bank, which may be on the premises of the bank, may be a cloud server, or may be a combination of on-premises and cloud-based computing.

In some embodiments, a unique symbol is presented to a display, visible to the user, such as the display of a smartphone or personal computer. During subsequent visit to the ATM by the user, the same symbol will be visible on a display of the ATM. The symbol informs the user which of multiple ATMs to access and is used to authenticate the hand-held device, enabling the transaction to be automatically completed without the user having to interact the ATM in a traditional manner. In some embodiments, the symbol operates as a sequenceless indicator to ATM customers, empowering the bank server to decide which customers are next in line, based on considerations such as ATM cash availability limitations.

Figure 2A:
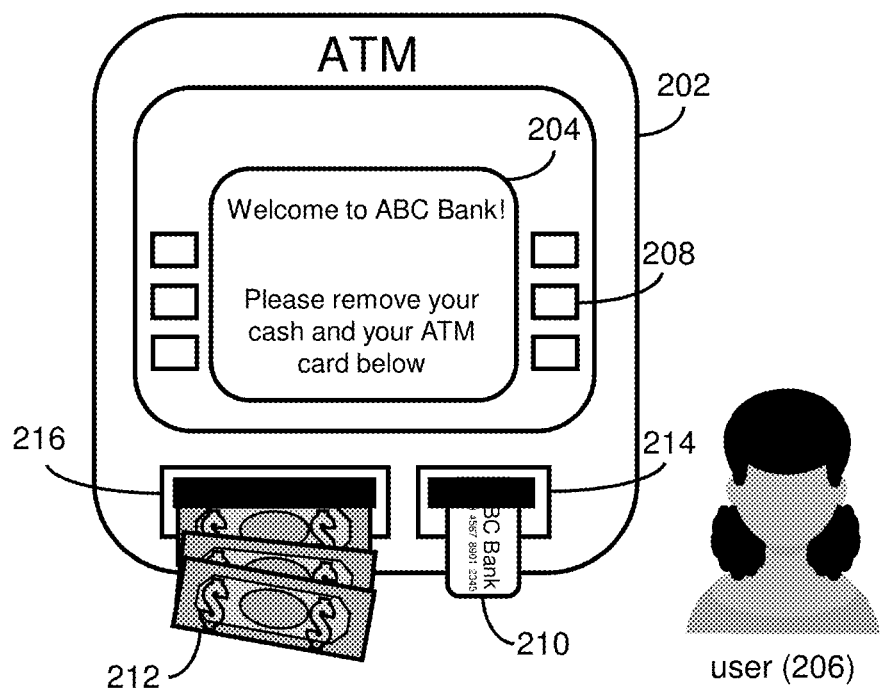
FIGS. 2A-2C are simplified diagrams of different ATM interfaces, according to some embodiments.
Figure 2B:
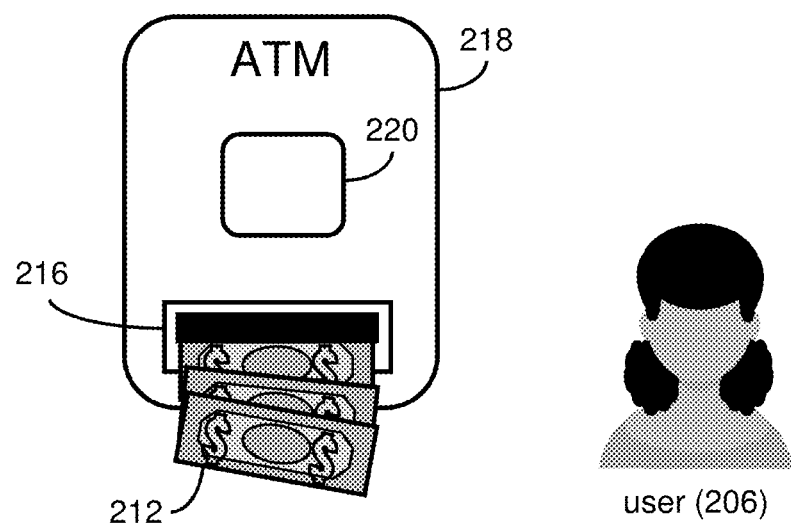
Figure 2C:
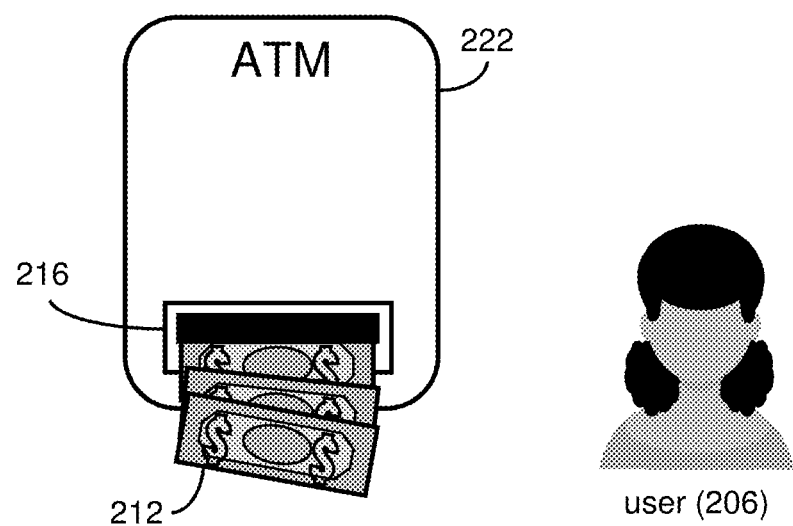

FIGS. 2A-2C are simplified illustrations of interfaces 200A-200C of transactions that may take place between a user 206 and an ATM, according to some embodiments. In each illustration, the user 206 is a customer of a financial institution (also known as an accountholder), and has at least one account with the financial institution, such as a checking account (personal or business) or savings account.

FIG. 2A illustrates a traditional ATM interface 200A. The ATM 202 is a secure, enclosed structure for storing cash deposits received from accountholders and cash to be dispensed to accountholders. The ATM 202 may be found inside or in the vicinity of the financial institution, but also may be found in other public places, such as a grocery store, an airport, a sports arena, an airport, a kiosk at a mall, a bar, and so on. In the example 200A, the transaction 200 is a request by the user 206 for a cash withdrawal from an account with the financial institution.

The ATM 202 includes an output interface 204 or display, such as a video monitor. In examples, the output interface 204 dynamically presents instructions to the user 206 to facilitate the transaction. This dynamic presentation of instructions is generally in the form of graphical user interfaces (GUIs), where the display may feature different GUI screens. The GUIs may feature words, graphics, or a combination. A GUI may prompt the user 206 to insert an ATM card, which may be a card dedicated to ATM transactions but may also be a debit card issued by the bank. The user may be prompted to enter a passcode, insert a cash deposit, retrieve cash, and so on, as separate screens. Alternatively, one or more of these prompts may be presented on a single screen. Accordingly, the interface 204 may present different instructions in association with different instructions being presented to the user or actions taken by the user.

The ATM 202 also includes an input interface 208, such as a keypad or buttons, that enables the user 206 to provide information during the transaction 200. Alternatively, where the display 204 is a touch screen, the input interface 208 may be part of, rather than adjacent to, the display, with select "buttons" being graphically presented on the screen. The user information may be a passcode, as one example. Or the information may be a selection of ATM options, such as "withdraw cash" or "check account balance". The ATM also includes an input slot 214, with which the user may insert a bank or ATM card 210, and an input/output slot 216, to which a deposit envelope may be inserted by the user 206 to the ATM 202, or from which cash 212 may be dispensed from the ATM to the user.

FIG. 2B illustrates a different ATM interface 200B. The ATM 218 still has the input/output slot 216, but the display 220 is much smaller than in the interface 200A. In some embodiments, the display 220 is of a size sufficient to display a symbol, discussed in more detail below. The ATM interface 200B represents what may be thought of as a minimal interface ATM.

FIG. 2C illustrates a third type of ATM interface 200C. This interface 200C still has the input/output slot 216, but no display at all. The ATM interface 200C represents what may be thought of as an interfaceless ATM.

The interfaces 200B and 200C are not traditional but may represent the ways ATMs will look in the future. In some embodiments, the method and apparatus for symbol utilization 100 of FIG. 1 is useful for the minimal interface ATM 200B and the interfaceless ATM 200B, by shifting the ATM transaction from the ATM machine to the hand-held device of the customer.

Evolution of the Banking Relationship

Banks and other financial institutions provide a number of different services involving finances, most notably, a checking or savings account. Hereinafter, a reference to a "bank" is meant to encompass other financial institutions, including, but not limited to credit unions, savings and loan institutions, financial services providers, and so forth. Initially, a customer of a bank would rely on a passbook, a booklet issued by the bank, enabling the accountholder to personally record how much money had been deposited or withdrawn from the account. More recently, an accountholder would receive a statement, usually monthly, in the mail.

With the advent of personal computers, banks began providing account statements by electronic mail for those users who selected the feature, such as being part of the institution's "paperless" option. Today, many banks enable customers to access their account information by way of a personal computer, laptop, tablet, notebook, pad, personal digital assistant, or other devices that have access to the Internet. By accessing a web page and providing a username and password as authentication, the user is able to receive a wealth of information about the bank account, including recent purchases and deposits, transaction entities, bank statements, and so on. These web accesses also enable transactions to take place, known colloquially as "online banking" in which automatic payments may be scheduled and money may be transferred between different accounts of the user, to a third-party account within the same bank, and even to third-party accounts with another bank. Relying on this Internet-based access, today's accountholder may view the current balance of an account twenty-four hours a day, seven days a week.

With the proliferation of hand-held device technology, such as smart phones, many banks have made applications (known colloquially as "apps") available to their customers. As long as the smartphone is able to access the Internet, the bank may provide a downloadable app for accessing a customer's bank account from the smartphone. Similar to the web page, the app, once selected, will generally request a username and password to authenticate the user. Alternatively, some apps enable access using a fingerprint or voiceprint to authenticate the user. Once authenticated, the user is able to review the account, such as to obtain balance information, scroll through transactions, make transfers to another account, deposit checks, and so on. These apps are intended to enhance the convenience for the accountholder. So, in addition to being able to access one's checking account by accessing a web page, a user may similarly access the account by enabling the app on a smartphone.

Figure 3:
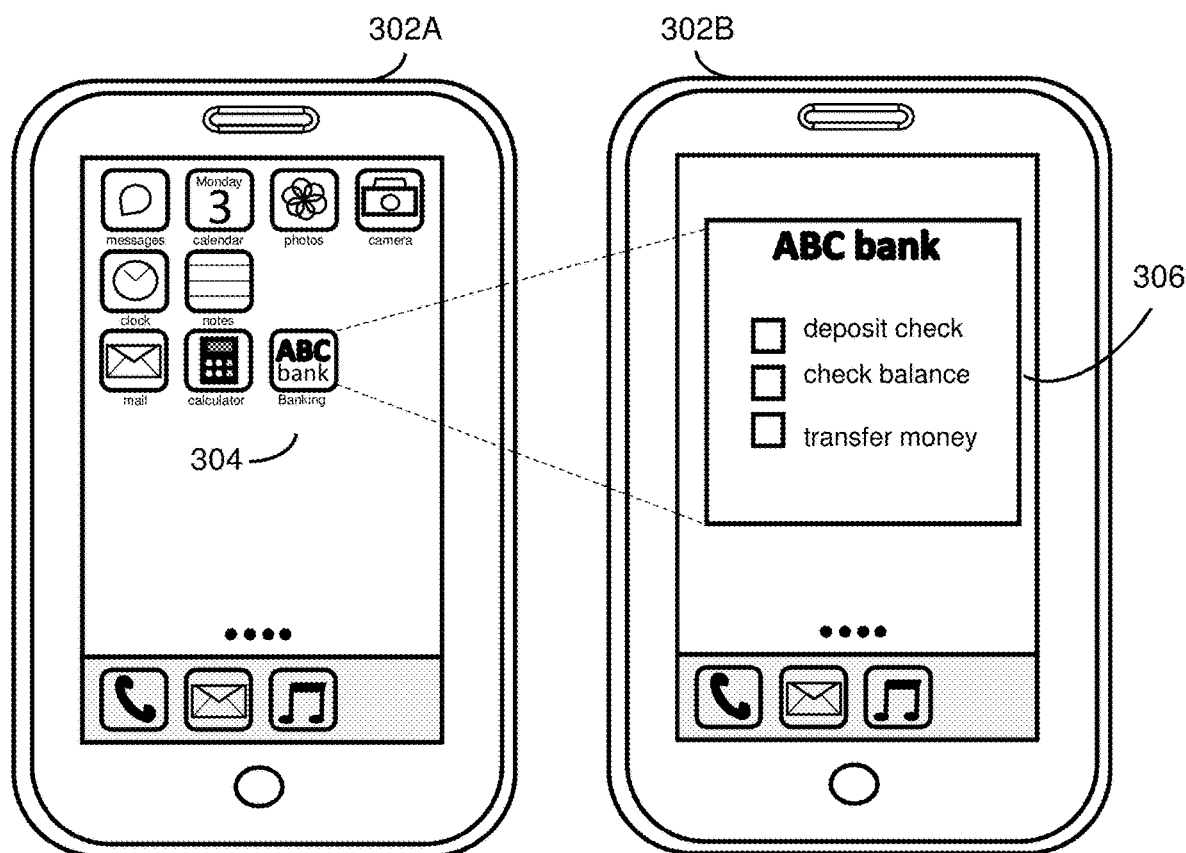
FIG. 3 is a simplified diagram of an application on a hand-held device, enabling access to a bank account, according to some embodiments.

FIG. 3, for example, shows a home page of a smartphone 302A containing several apps, including a banking app 304 for ABC Bank. Upon enabling or selecting the banking app 304, a second GUI of the smartphone 302B is shown, in which a window 306 for ABC Bank opens, much like a web page opens when accessing the bank account from one's personal computer or other Internet-capable device. The window 306 enables the user to select some operation, in this example, "deposit check", "check balance", or "transfer money".

Further to providing an app on the hand-held device of the user, some banks enable the user to "pre-stage" a transaction, in which a desired transaction is separated into parts, an initiation part in which the transaction is specified from the Internet-capable device and a completion part in which the transaction is to be completed at an ATM or with a teller at the bank. Such pre-staging may be particularly useful at minimal interface ATMs (e.g., 200B) and interfaceless ATMs (e.g., 200C). The transaction may be initiated by accessing the web page on the user's personal computer or accessing the app on the user's hand-held device. The user may, for example, initiate a cash withdrawal, using the app on the cellphone or other smart device. The completion of the transaction may vary. For example, the app on the user's cellphone may have a barcode that is scanned at the ATM to complete a cash withdrawal. Or, the app may generate a code that the user gives to the teller upon arriving at the bank. The pre-staged transaction is designed to simplify the transaction and make user access to the account more convenient.

FIG. 4 is a simplified illustration of how the pre-staged transaction may operate, according to some embodiments. The accountholder 206 accesses the ABC Bank web page or app from an Internet-capable device such as a personal computer, smartphone, and so on. A request to withdraw some cash is made (1). The web page/app invokes a new page that invites the accountholder to select an amount of the transaction (2). Upon making a selection, another page is displayed that provides an access code (in this example, the access code is 7cVx3) for the pre-staged transaction (3). Alternatively, the access code may be a Universal Product Code (UPC), known colloquially as a "bar code", that is designed to communicate with the ATM, a Quick Response (QR) Code, or any other digitally communicable code or visual data matrix.

The horizontal dotted line in FIG. 4 is meant to indicate physically disparate locations. Thus, the user 206 moves from a first location (e.g., home or office) to a second location (e.g., the location of the ATM). The customer goes to an ATM (4), retrieves the access code from, in this example, the smartphone (5), and enters the access code as indicated by the ATM display (6), after which the requested cash amount is dispensed by the ATM (7). Where the access code was obtained from a web page on a personal computer, the customer may write the access code down, take a picture of the access code, take a snapshot of the access code on the screen and send it to the smartphone, and so on, before going to the second location.

Figure 5A:
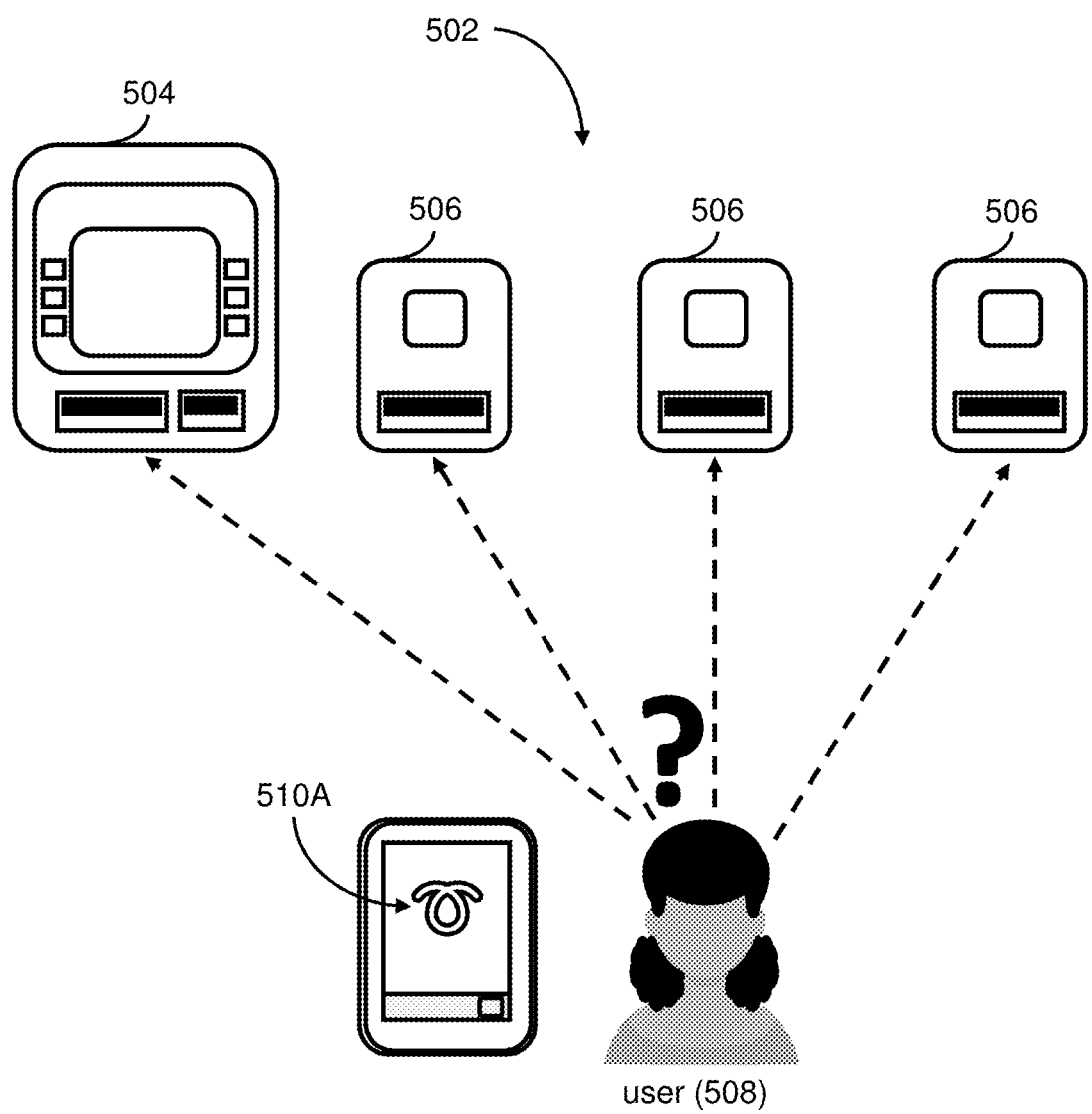
Figure 5B:
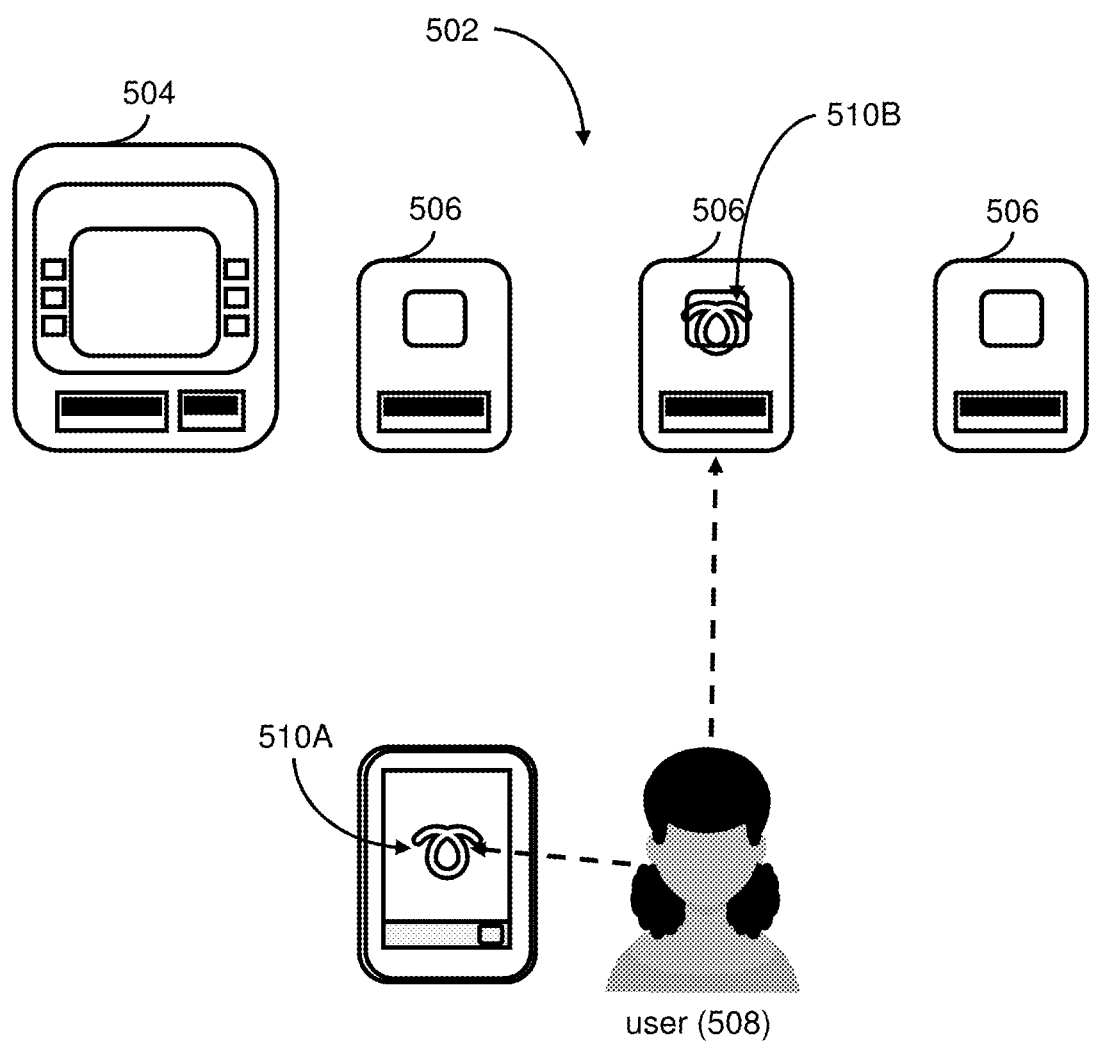
Figure 6A:
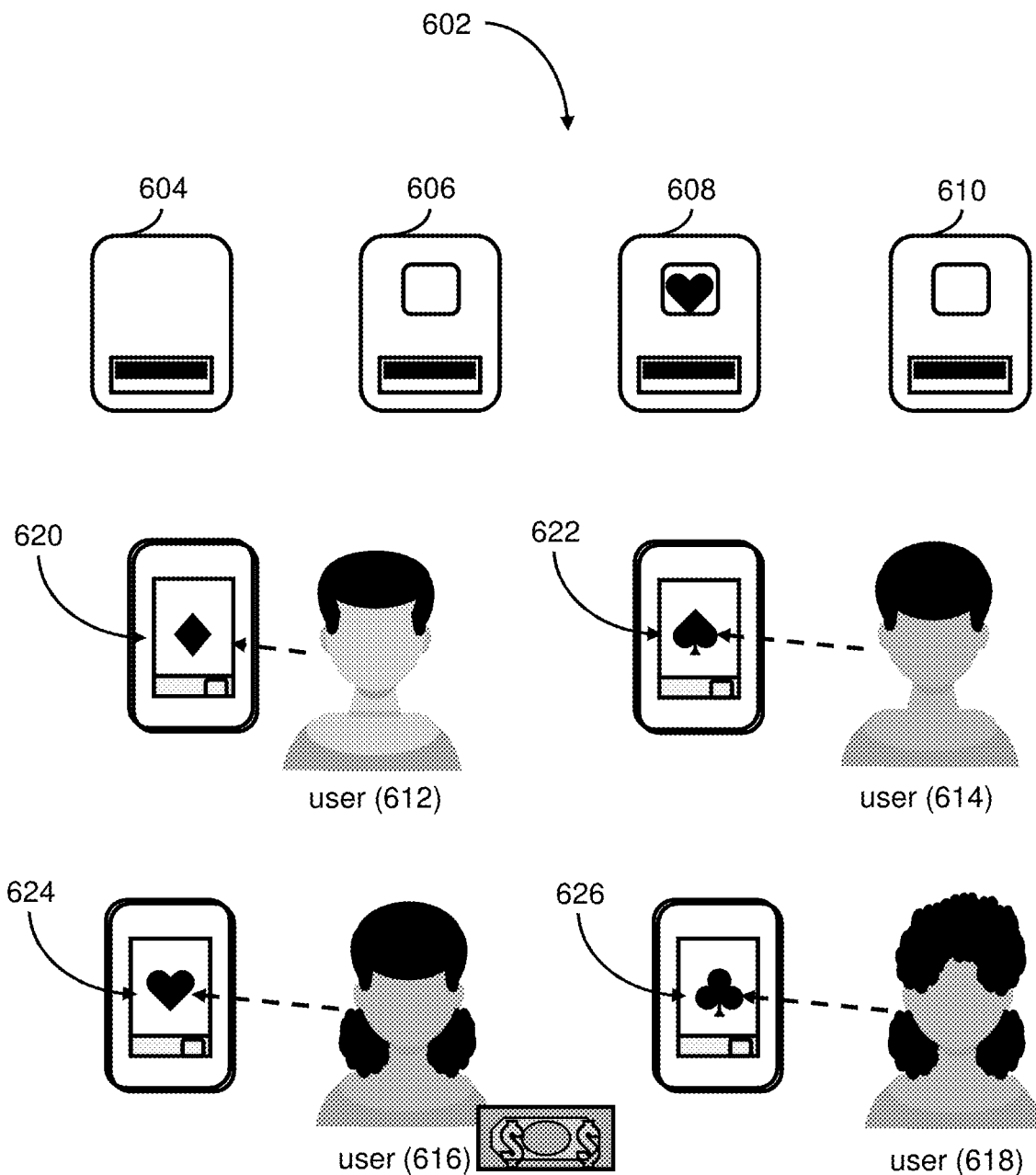
FIGS. 6A-6D are diagrams illustrating the symbol utilization of FIG. 1 by multiple users, according to some embodiments.
Figure 6B:
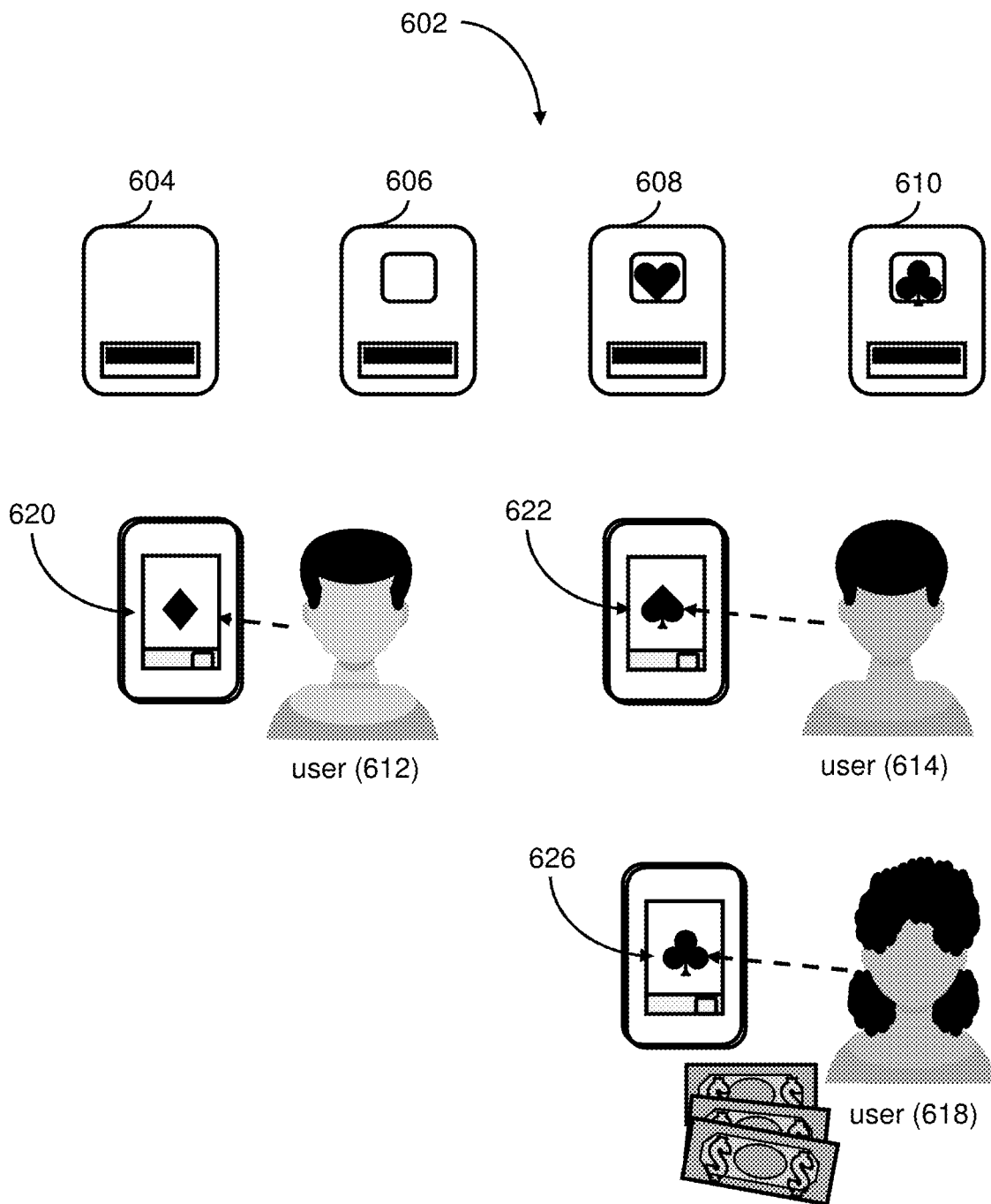
Figure 6C:
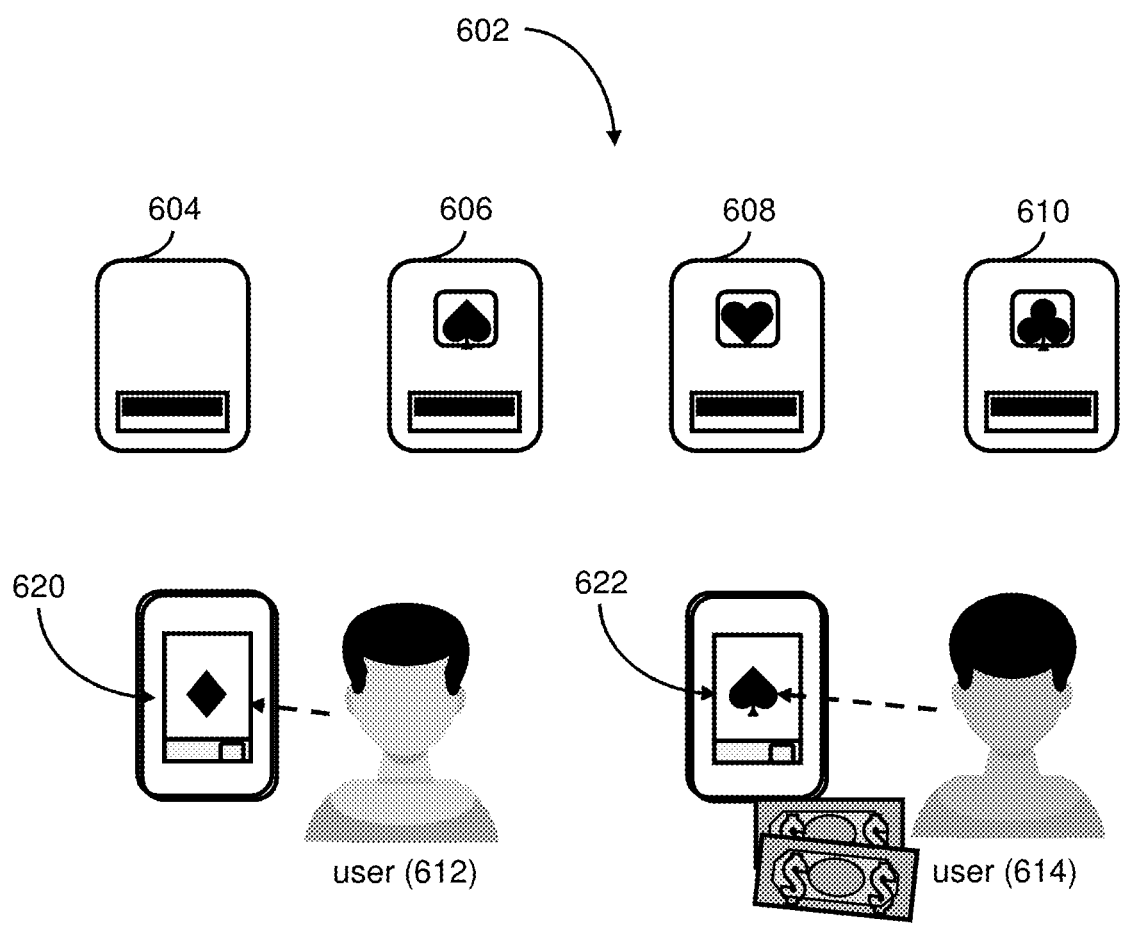
Figure 6D:
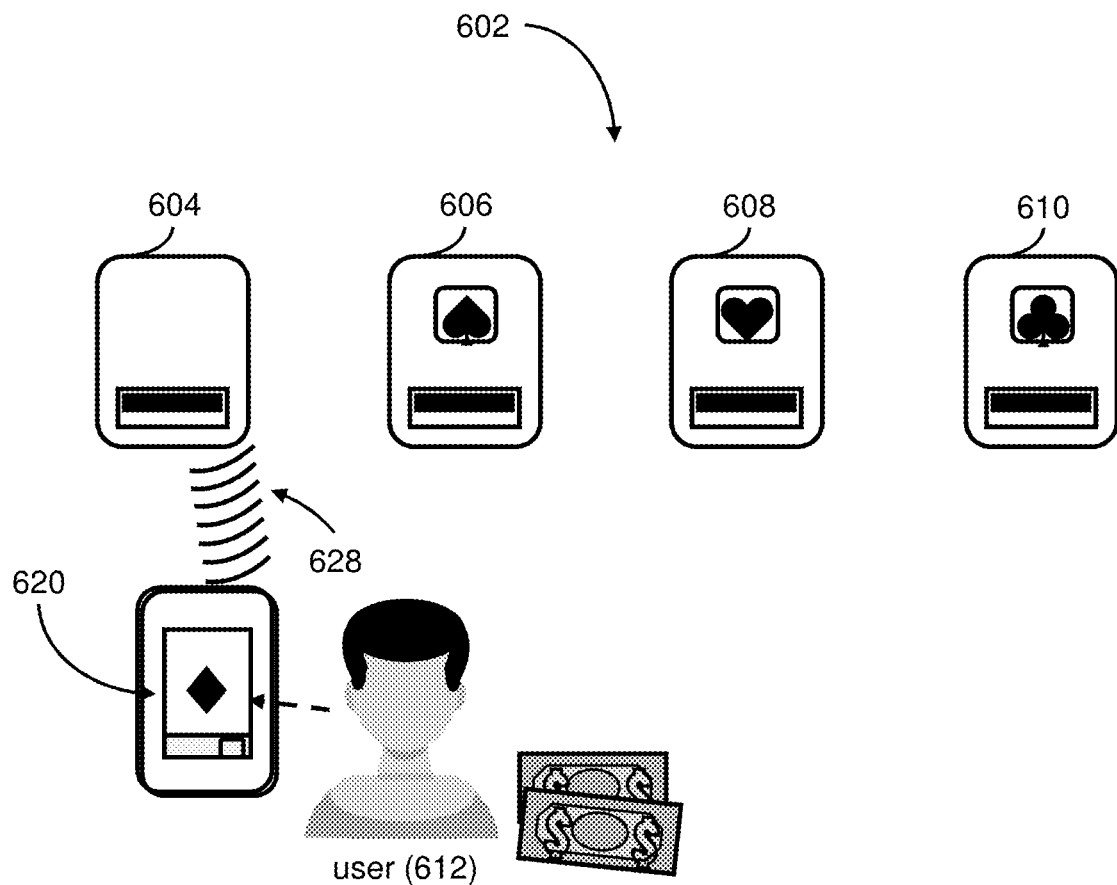

Suppose the accountholder pre-stages a transaction and obtains the access code from the comfort of a home or office ($1^{st}$ location). The user travels to where the ATM is located ($2^{nd}$ location) but, instead of finding a single ATM, encounters multiple ATMs at the location. Additionally, suppose there are lots of people, all of whom have pre-staged transactions and are now waiting in front of the array of ATMs. FIGS. 5A, 5B, and 5C depict a scenario 500 having three parts, 500A, 500B, and 500C, respectively, in which the accountholder 206 encounters an array of ATMs of varying configurations. The scenario 500 is used to illustrate how the symbol utilization 100 is beneficial, in some embodiments.

In scenario 500A (FIG. 5A), an array of ATMs 502 consists of a traditional ATM 504 and three ATMs 506 having minimal interfaces. The array of ATMs 502 may, for example, be located in a crowded public area such as a mall, an airport, or a sports arena. It may also be the case that there are people standing in front of one or more of the ATMs at the time the accountholder 508 arrives at the array 502. Instead of receiving an access code, the user receives a unique symbol 510A on the mobile device. Initially, the accountholder does not know which ATM to approach to complete the pre-staged transaction. Because the transaction was pre-staged, the accountholder 508 has the symbol 510A on her mobile device. The accountholder 508 may assume one of the minimal interface ATMs is intended for her pre-staged transaction, but the symbol 510 may appear on any of the four ATMs. Further, the accountholder 508 may be one of several individuals waiting their turn at one of the ATMs.

FIG. 5B shows the second scenario 500B, in which the symbol 510B appears on one of the ATMs. The accountholder selects the ATM 506 displaying the unique symbol 510B, where the symbol on the ATM is the same as the symbol 510A on the smartphone (collectively, "symbol 510"). In this manner, the symbol 510 identifies to the user which ATM to select from an array of ATMs.

After the user has pre-staged the bank transaction, the symbol 510 on the smartphone can be matched to one of multiple ATMs in the space. In some embodiments, the symbol is obtained in a manner similar to how the access code is obtained, by accessing either the bank's web page or the app located on the user's hand-held device. The symbol itself is a non-personal piece of information that can be used to identify which ATM to use and authenticate into. Because the symbol is not personal to the user, the symbol is meaningless to other users of the ATMs and does not compromise any personal information of the accountholder. The use of personal information, such as name, account number, etc., to signal a user to a particular kiosk or array of ATMs is thus avoided.

FIG. 5C is a simplified illustration of symbol utilization 100 operations, according to some embodiments. As in FIG. 4, this example embodiment involves the pre-staging of a transaction by the accountholder. The accountholder 508 accesses the ABC Bank web page or app from an Internet-capable device such as a personal computer, smartphone, and so on. A request to withdraw some cash is made (1). The web page/app invokes a new page that invites the accountholder to select an amount of the transaction (2). Upon making a selection, another page is displayed that provides the unique symbol 510 for the pre-staged transaction (3).

As before, the user 508 moves from a first location (e.g., home or office) to a second location (e.g., the location of the ATM). The customer goes to an array of ATMs 520 (4). This time, the array 520 consists of a traditional ATM 522, two minimal interface ATMs 524 and 528, and an interfaceless ATM 526. If the user 508 sees the symbol 510 on one of the ATMs in the array, which is also visible on the smartphone (5), she knows which ATM to approach to complete the transaction.

In this example, however, none of the ATMs having displays (522, 524, and 528) are showing the symbol. Instead, in some embodiments, when the accountholder approaches the vicinity of the ATM for which her transaction is pre-staged, a Near-Field Communication (NFC) or similar protocol 530 is automatically established between the ATM and the smartphone of the accountholder (6). The ATM automatically knows to dispense cash (7) in accordance with the pre-staged transaction (2). In this example, the accountholder is able to complete the transaction with the ATM without explicitly accessing the ATM. In other words, the accountholder does not have to touch an input interface (keypad) or touch-based display, because there exist neither on the interfaceless ATM 526, to complete the transaction. The user 508 may notice a visual or audible indicator on her hand-held device, such as the symbol flashing, to indicate that she is in front of the correct ATM and can take the cash dispensed therefrom. Once the NFC is established between the ATM and the smartphone and the symbols of each is verified, the transaction completed automatically, in some embodiments.

In some embodiments, the symbol utilization 100 is helpful in crowd scenarios when people are waiting for service. For example, suppose a group of people are at a butcher shop, waiting to buy meat. The butcher shop has a helpful ticket dispenser in which patrons know when they enter the shop to take a ticket from the dispenser. The ticket tape in the dispenser has a sequential series of numbers, such that each person taking a ticket from the dispenser gets a number larger than the previous person, thus indicating each person's place in line. The first patron, for example, may select a ticket that says "78"; the next patron then selects the ticket with "79" printed thereon; the next patron selects a ticket showing the number "80", and so on. If the butcher calls the number "80" before the person holding the "79" ticket has been served, the person with the "79" ticket will immediately know she has been passed up in the line, and a confrontation with the butcher may ensue.

The symbol utilization 100 avoids this scenario by having non-sequential symbols with which accountholders may pre-stage ATM transactions. Now imagine a large crowd of people are watching a hockey game at a hockey arena. Just before halftime, a hundred people from that large crowd realizes that they need money before they get in line for beer, so they all pre-stage ATM transactions from their mobile devices. According to the symbol utilization 100, each person receives a different, unique symbol on their mobile device. At halftime, these hundred people proceed toward a bank of ten ATMs. By using symbols rather than numbers, none of these individuals know which one was the first to pre-stage their ATM transaction.

FIGS. 6A-6D present four snapshots in time 600A-600D (collectively, "scenario 600") in which the symbol utilization 100 of FIG. 1 maintains fairness between customers, according to some embodiments. The scenario 600 illustrates how having a non-sequential symbol provides no indication about who is first to receive service following a pre-staged transaction.

In the scenario 600, an array of ATMs 602 consists of an interfaceless ATM 604 and three minimal interface ATMs 606, 608, and 610. Because these ATMs only have a single slot, they are limited to pre-staged transactions involving either cash deposits or cash withdrawals. Four different users 610, 612, 616, and 618 have pre-staged ATM transactions on their mobile devices 620, 622, 624, and 626, such that their mobile devices depict four different symbols, in this case, "diamond", "spade", "heart", and "clover", respectively.

In the first time period 600A (FIG. 6A), a "heart" is presented on the display of minimal interface ATM 608. User 616 thus is provided a visual indicator that it is her turn at the ATM 608. The other users 612, 614, and 618 do not have any way to know whether user 616 pre-staged her transaction before they did and are thus concerned only with looking for their symbol to pop up on one of the screens.

In the second time period 600B (FIG. 6B), a "clover" is presented on the display of minimal interface ATM 610. User 618 thus knows it is her turn at the ATM 610. The users 612 and 614 still waiting are unconcerned that the "clover" has been displayed, since the neither the "diamond" nor the "spade" are considered to come before the "clover". Because there are two ATMs 608 and 610 displaying symbols, it is possible that the first time period 600A is very close or the same as time period 600B.

In the third time period 600C (FIG. 6C), a "spade" is presented on the display of minimal interface ATM 606. This informs user 614 that it is his turn to complete his pre-staged transaction at ATM 606. User 612, the holder of the "diamond" symbol, is waiting patiently for his symbol to be displayed, with no concern that he pre-staged his transaction prior to the other users 614, 616, 618, and the order of symbol display is thus unfair.

Finally, in the fourth time period 600D (FIG. 6D), the interfaceless ATM 604 sends a communication 628, such as NFC, to the mobile device 620 of user 612. The user 612 may become aware of the communication 628 by receiving a visible or audible indicator on his mobile device 620, and this may be coincident with an audible sound coming from the ATM 604. The user 612 is thus able to complete his transaction.

The scenario 600 shows how fairness is achieved with the symbol utilization 100. By choosing symbols that are not sequential, the users, especially in crowd situations, are led to believe that their transactions are handled in the order in which they were received. There are scenarios, however, in which the symbol utilization 100 can change the order of service, based on ATM cash availability limitations.

Suppose for example an ATM is low on cash. If the ATM is part of an array of ATMs and the other ATMs are not experiencing the cash flow limitation, the symbol utilization 100 can direct users to the other ATMs that are not low on cash. Further, where users are pre-staging deposit transactions, the symbol utilization 100 can encourage the deposits to be made to an ATM that is low on cash.

This might mean that the symbol utilization 100 processes pre-staged transactions not in the order received. Nevertheless, the change in ordering of the transaction processing benefits the customers by helping to maintain a cash distribution in the ATMs where possible.

Figure 7A:
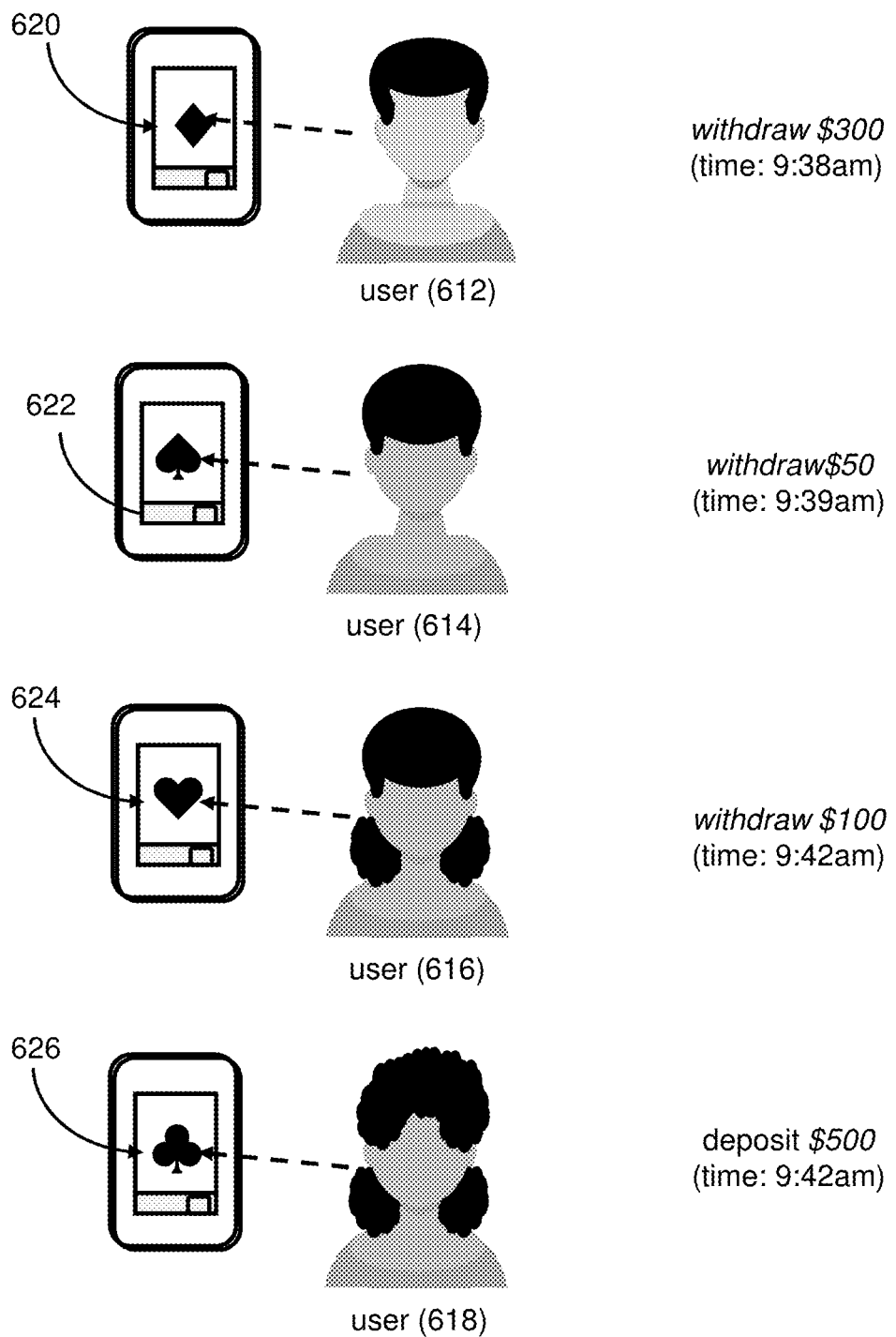
FIGS. 7A and 7B are diagrams illustrating the symbol utilization of FIG. 1 in cases where an ATM is low on cash, according to some embodiments.
Figure 7B:
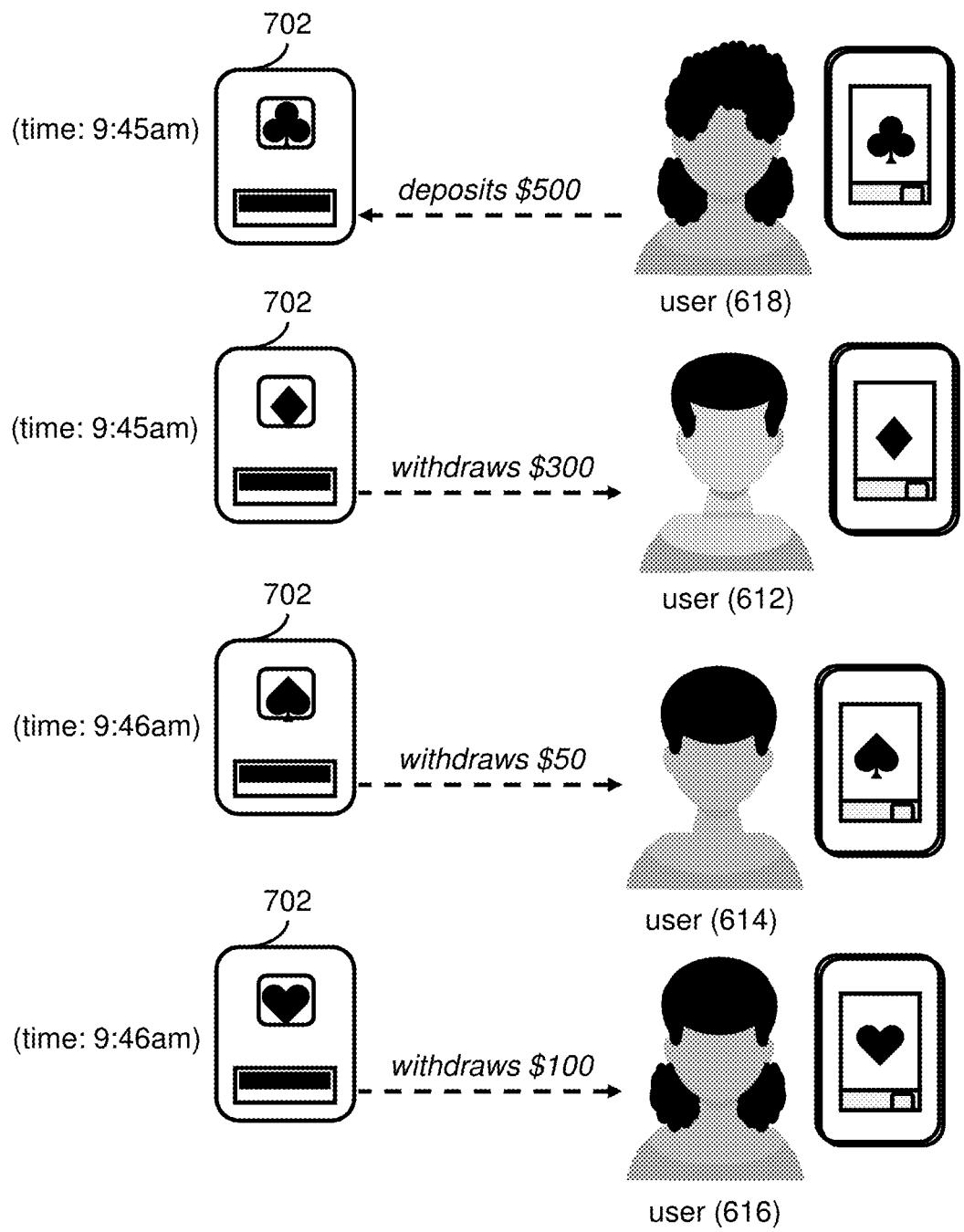

FIGS. 7A and 7B present scenario 700 in two parts, 700A where the pre-staging is occurring, and 700B where the transactions are processed. Our users 612, 614, 616, and 618 are pre-staging transactions using their respective mobile devices 620, 622, 624, and 626, and all are pre-staging their transactions at the specified time. First, user 612 pre-stages a withdrawal of $300 at 9:38 am, and receives a "diamond" symbol on his mobile device. Next, user 614 pre-stages a withdrawal of $50 at 9:39 am, just after user 612. Then, both users 616 and 618 pre-stage transactions at 9:42 am, the first user pre-staging a withdrawal of $100 and the second pre-staging a deposit of $500.

An ATM that is low on cash, or actually, the bank server that controls the ATM (FIG. 1), would be very interested in getting that user 618 to deposit her cash at the ATM. So, in comparison to three users who want to withdraw cash, the user 618 will be favored over them, since she is depositing cash.

FIG. 7B illustrates the second part 700B of the scenario. For simplicity, all transactions in this scenario 700 take place at a single ATM 702. First, based upon seeing her "clover" symbol appear on the ATM display, the user 618 deposits $500 at 9:45 am. Next, the user 612, who was technically first in line in pre-staging his transaction, will be able to withdraw $300, also at 9:45 am. Then, the user 614 withdraws $50 at 9:46 am, and, finally, the user 616 withdraws $100, also at 9:46 am. Other than the user making the deposit getting to jump ahead in line, all other processing at the ATM takes place in the order the pre-staged transactions were received.

FIGS. 7A and 7B illustrates how ATM cash flow limitations can be addressed. Although the pre-staged transaction of user 618 was processed out of order, since she was the last in the group to pre-stage the transaction, the other users were unaware of this fact, since the pre-staging all took place at the mobile devices of the users.

Figure 8A:
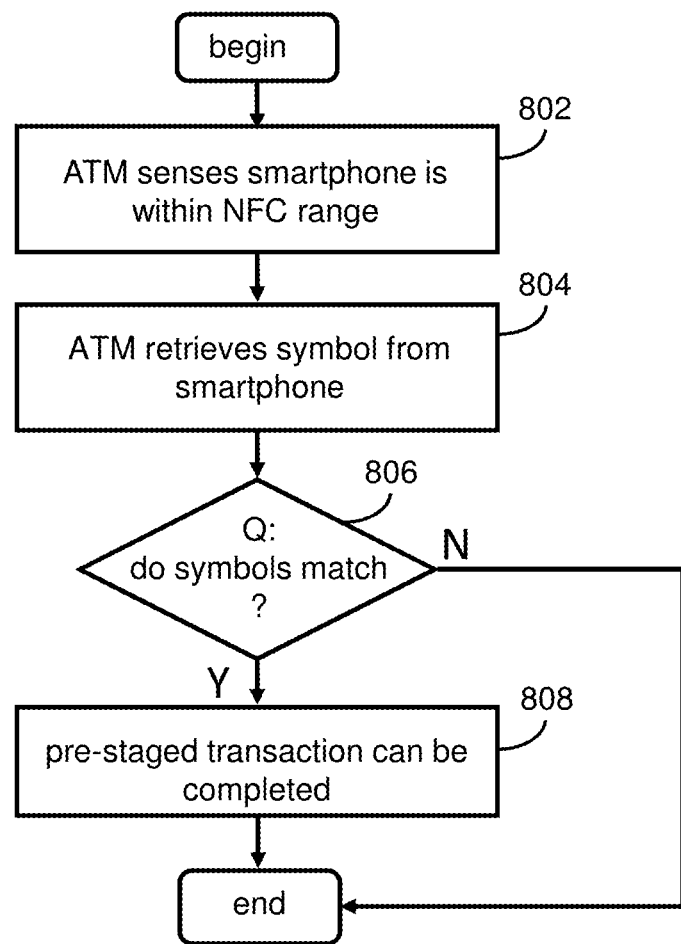
FIGS. 8A and 8B are flow diagrams of the symbol utilization of FIG. 1 in two scenarios, according to some embodiments.
Figure 8B:
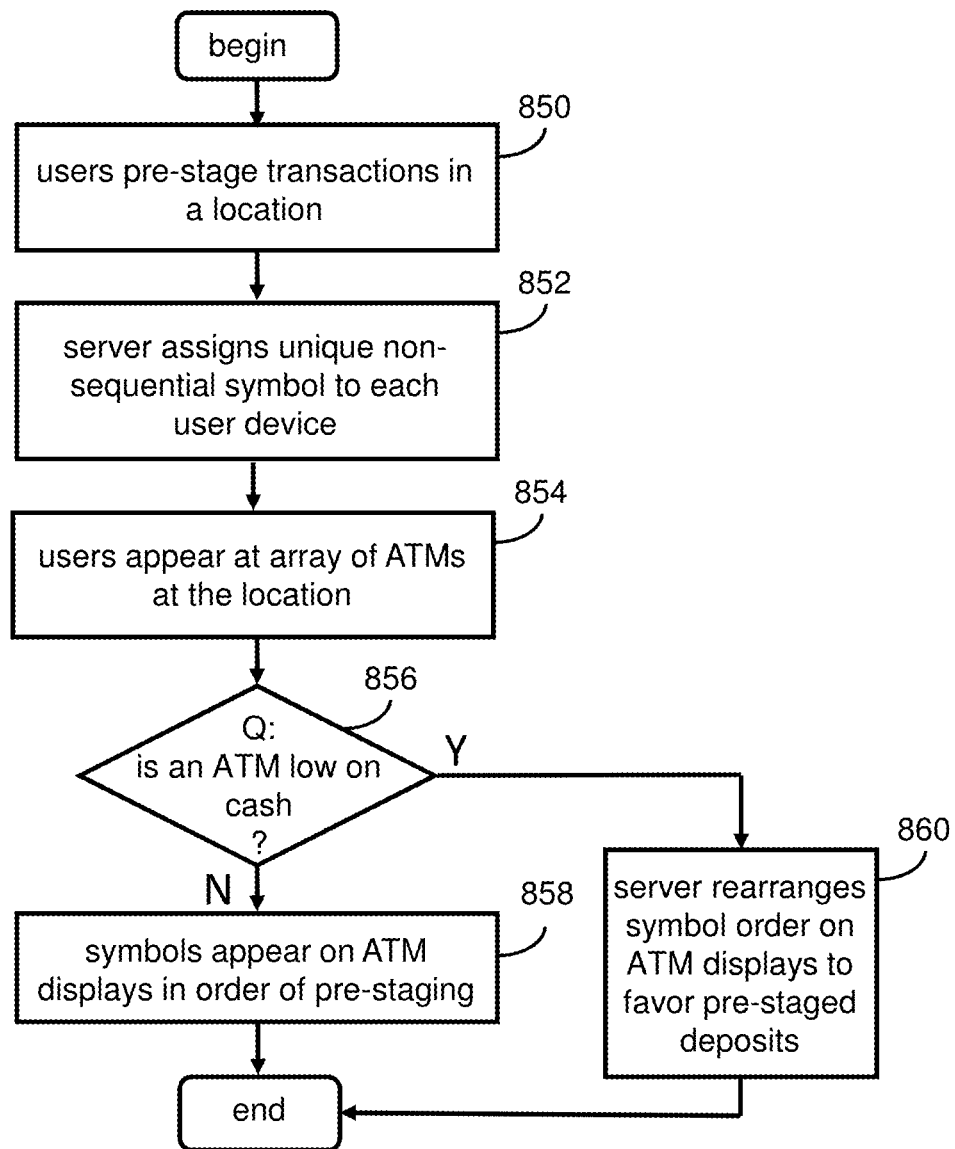

FIGS. 8A and 8B are flow diagrams illustrating some of the above concepts. In FIG. 8A, operations 800A are showing how communication between the ATM and the smartphone enables completion of the transaction, according to some embodiments. The ATM first senses that the smartphone is within NFC range (block 802). The ATM automatically retrieves the symbol from the smartphone (block 804). Alternatively, the ATM could include a scanner and prompt the user to hold the smartphone up to the scanner for verification. If the symbol retrieved from the smartphone does not match the symbol of the ATM (the "no" prong of block 806), the flow operations are finished, and no transaction takes place. Otherwise, the symbols match (the "yes" prong of block 806) and, thereafter, the pre-staged transaction can be completed (block 808).

In FIG. 8B, operations 800B are showing how the bank server (FIG. 1) manages pre-processing of transactions in the face of ATM cash availability issues. Multiple users pre-stage transactions, as described above, in a location (block 850). In this example, the pre-staging is done in a location so that the bank server knows the users will go to a particular ATM or array of ATMs, such as at a sports arena or mall. Upon pre-staging, the server assigns a unique non-sequential symbol to each user device (block 850).

The users who pre-staged transactions now appear at the ATMs (block 854). The ATMs may be one, two, or many ATMs and, because the transactions are pre-staged, the users are not standing in line at the ATMs, but are looking to the displays on the ATMs to see if their symbol appears. At the bank server, an assessment is made whether one or more of the ATMs is low on cash (block 856). If not, the symbols issued to the respective users appear on the ATM displays in the order of pre-staging (block 858). Otherwise, there is cash flow issue in one or more of the ATMs, and thus the server rearranges the order of symbol presentation to favor user(s) making deposits at the ATMs (block 860). The operations 800B are complete.

In some embodiments, a unique symbol is assigned to each transaction. In other embodiments, a unique symbol is assigned to each accountholder. The symbols may be assigned to a transaction or an accountholder for a limited period of time, such as each day or each hour. The symbol may consist of graphical characters, pictograms, icons, and may be simple or complex. The symbol may consist of more than one symbol, as long as the symbol remains unique to the user or transaction for the allotted time period. The symbols may have one or more color assignment, such as an outlined symbol where the outline is one color and the interior of the symbol is another color. The symbol may be patterned.

Figure 9:
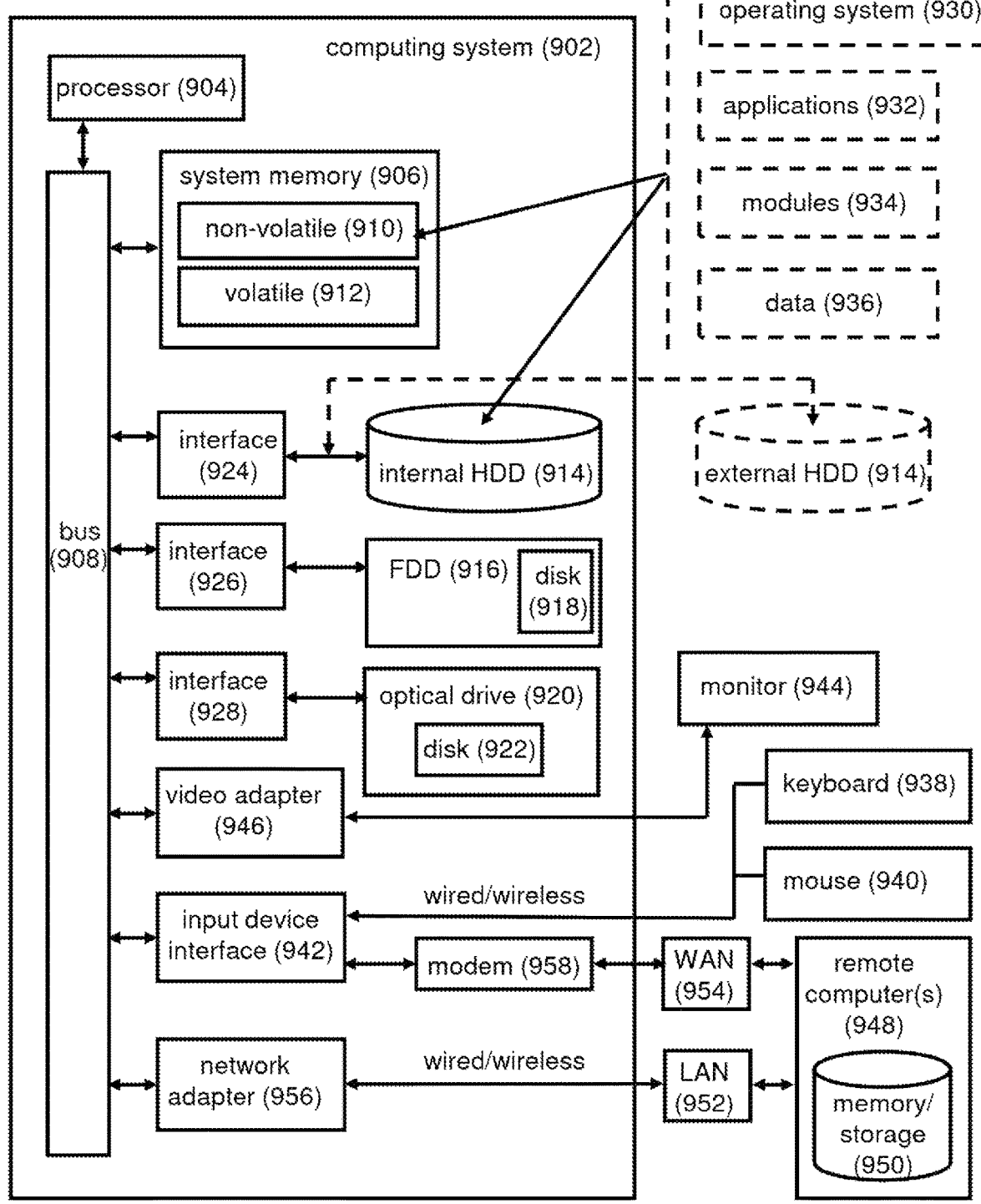
FIG. 9 is an illustration of an exemplary computing architecture comprising for implementing the symbol utilization of FIG. 1, according to some embodiments.

FIG. 9 illustrates an embodiment of an exemplary computing architecture 900 comprising a computing system 902 that may be suitable for implementing various embodiments as previously described. In various embodiments, the computing architecture 900 may comprise or be implemented as part of an electronic device. In some embodiments, the computing architecture 900 may be representative, for example, of a system that implements one or more components of the symbol utilization 100. In some embodiments, computing system 902 may be representative, for example, of the mobile devices used in implementing the symbol utilization 100. The embodiments are not limited in this context. More generally, the computing architecture 900 is configured to implement all logic, applications, systems, methods, apparatuses, and functionality described herein.

As used in this application, the terms "system" and "component" and "module" are intended to refer to a computer-related entity, either hardware, a combination of hardware and software, software, or software in execution, examples of which are provided by the exemplary computing architecture 900. For example, a component can be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 902 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 902.

As shown in FIG. 9, the computing system 902 comprises a processor 904, a system memory 906 and a system bus 908. The processor 904 can be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi-processor architectures may also be employed as the processor 904.

The system bus 908 provides an interface for system components including, but not limited to, the system memory 906 to the processor 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computing system 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies. The computing system 902 is generally is configured to implement all logic, systems, methods, apparatuses, and functionality described herein with reference to FIGS. 1-8.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the symbol generator 100, e.g., the mobile app 102 and web page 104.

A user can enter commands and information into the computing system 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computing system 902. In addition to the monitor 944, a computer typically includes other peripheral output devices, such as speakers, printers, and so forth.

The computing system 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computing system 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computing system 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computing system 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computing system 902, or portions thereof, can be stored in the remote memory/storage device 950. It will be appreciated that the network connections shown are exemplary and other means of establishing a communications link between the computers can be used.

The computing system 902 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operation in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

What is claimed is:

1. A method, comprising:
   receiving, by a mobile device, input for a pre-staged transaction to be completed at any of a plurality of automatic teller machines (ATMs);
   transmitting, by the mobile device, the input to a server associated with the plurality of ATMs; receiving, by the mobile device from the server, a first graphical symbol assigned to the pre-staged transaction;
   providing, by the mobile device, the first graphical symbol to one of the plurality of ATMs displaying the first graphical symbol; and
   enabling the one of the plurality of ATMs to process the pre-staged transaction based on the first graphical symbol.

2. The method of claim 1, wherein providing the first graphical symbol comprises:
   transmitting, by the mobile device, the first graphical symbol to the one of the plurality of ATMs via near-field communication (NFC).

3. The method of claim 1, wherein providing the first graphical symbol comprises:
   displaying the first graphical symbol on a display of the mobile device, wherein a scanner device of the one of the plurality of ATMs is configured to scan the first graphical symbol on the display.

4. The method of claim 1, wherein the one of the plurality of ATMs is assigned to the pre-staged transaction by the server based on an amount of funds in each ATM of the plurality of ATMs.

5. The method of claim 4, wherein the pre-staged transaction is a first pre-staged transaction of a plurality of pre-staged transactions, wherein the first graphical symbol is the first graphical symbol of a plurality of graphical symbols, wherein each of the plurality of pre-staged transactions is associated with a respective one of the plurality of graphical symbols, and wherein the plurality of graphical symbols are distinct and do not have a sequential relationship to one another.

6. The method of claim 5, wherein the first pre-staged transaction is transmitted to the server subsequent to a second pre-staged transaction of the plurality of pre-staged transactions, and wherein the first pre-staged transaction is processed prior to the second pre-staged transaction.

7. The method of claim 1, wherein the pre-staged transaction is automatically processed by the one of the plurality of ATMs based on the mobile device providing the first graphical symbol to the one of the plurality of ATMs, and wherein the server assigns the first graphical symbol to the one of the plurality of ATM.

8. The method of claim 7, wherein the pre-staged transaction is a deposit transaction, and wherein the one of the plurality of ATMs automatically processes the deposit transaction by automatically accepting a deposit.

9. An apparatus comprising:
   a processor; and
   a memory storing instructions, that when executed by the processor, cause the processor to:
      receive input for a pre-staged transaction to be completed at any of a plurality of automatic teller machines (ATMs);
      transmit the input to a server associated with the plurality of ATMs;
      receive, from the server, a first graphical symbol assigned to the pre-staged transaction;
      provide the first graphical symbol to one of the plurality of ATMs displaying the first graphical symbol; and
      enabling the one of the plurality of ATMs to process the pre-staged transaction based on the first graphical symbol.

10. The apparatus of claim 9, the memory storing instructions, that when executed by the processor, cause the processor to:
    transmit the first graphical symbol to the one of the plurality of ATMs via near-field communication (NFC).

11. The apparatus of claim 9, the memory storing instructions, that when executed by the processor, cause the processor to:
    display the first graphical symbol on a display of the apparatus to provide the first graphical symbol to the one of the plurality of ATMs.

12. The apparatus of claim 9, wherein the one of the plurality of ATMs is assigned to the pre-staged transaction by the server based on an amount of funds in each of the plurality of ATMs.

13. The apparatus of claim 12, wherein the pre-staged transaction is a first pre-staged transaction of a plurality of pre-staged transactions, wherein the first graphical symbol is the first graphical symbol of a plurality of graphical symbols, wherein each of the plurality of pre-staged transactions is associated with a respective one of the plurality of graphical symbols, and wherein the plurality of graphical symbols are distinct and do not have a sequential relationship to one another.

14. The apparatus of claim 9, wherein the pre-staged transaction is automatically processed by the one of the plurality of ATMs based on the apparatus providing the first graphical symbol to the one of the plurality of ATMs, and wherein the server assigns the first graphical symbol to the one of the plurality of ATMs.

15. A non-transitory computer-readable storage medium comprising instructions that, when executed by a processor of a device, cause the processor to:
receive input for a pre-staged transaction to be completed at any of a plurality of automatic teller machines (ATMs);
transmit the input to a server associated with the plurality of ATMs;
receive, from the server, a first graphical symbol assigned to the pre-staged transaction;
provide the first graphical symbol to one of the plurality of ATMs displaying the first graphical symbol; and
enabling the one of the plurality of ATMs to process the pre-staged transaction based on the first graphical symbol.

16. The computer-readable storage medium of claim 15, further comprising instructions that, when executed by the processor, cause the processor to:
transmit the first graphical symbol to the one of the plurality of ATMs via near-field communication (NFC).

17. The computer-readable storage medium of claim 15, further comprising instructions that, when executed by the processor, cause the processor to:
display the first graphical symbol on a display of the device to provide the first graphical symbol to the one of the plurality of ATMs.

18. The computer-readable storage medium of claim 15, wherein the one of the plurality of ATMs is assigned to the pre-staged transaction by the server based on an amount of funds in each of the plurality of ATMs.

19. The computer-readable storage medium of claim 18, wherein the pre-staged transaction is a first pre-staged transaction of a plurality of pre-staged transactions, wherein the first graphical symbol is the first graphical symbol of a plurality of graphical symbols, wherein each of the plurality of pre-staged transactions is associated with a respective one of the plurality of graphical symbols, and wherein the plurality of graphical symbols are distinct and do not have a sequential relationship to one another.

20. The computer-readable storage medium of claim 15, wherein the pre-staged transaction is automatically processed by the one of the plurality of ATMs based on the device providing the first graphical symbol to the one of the plurality of ATMs, and wherein the server assigns the first graphical symbol to the one of the plurality of ATMs.

* * * * *